(12) United States Patent
Weisse

(10) Patent No.: US 6,871,541 B2
(45) Date of Patent: Mar. 29, 2005

(54) LEVEL METER

(75) Inventor: Michael Weisse, Duesseldorf (DE)

(73) Assignee: TI Automotive (Neuss) GmbH, Neuss (DE)

( * ) Notice: Subject to any disclaimer, the term of this patent is extended or adjusted under 35 U.S.C. 154(b) by 47 days.

(21) Appl. No.: 10/410,717

(22) Filed: Apr. 10, 2003

(65) Prior Publication Data

US 2004/0016296 A1 Jan. 29, 2004

(30) Foreign Application Priority Data

Apr. 11, 2002 (DE) .......................................... 102 15 898

(51) Int. Cl.⁷ ............................................. G01F 23/38
(52) U.S. Cl. ........................................... 73/314; 73/317
(58) Field of Search .............................. 73/290 R, 305, 73/314, 317, 313

(56) References Cited

U.S. PATENT DOCUMENTS

| 4,833,919 A | 5/1989 | Saito et al. .................... 73/313 |
| 6,401,533 B1 | 6/2002 | Gier et al. ..................... 73/313 |
| 6,561,022 B1 * | 5/2003 | Doyle et al. ................... 73/313 |
| 6,578,417 B1 * | 6/2003 | Eck .............................. 73/305 |

FOREIGN PATENT DOCUMENTS

| DE | 3905745 | 12/1990 | |
| DE | 19701246 | 7/1998 | ................. 73/313 |
| JP | 2000-275088 | 10/2000 | |

* cited by examiner

Primary Examiner—Daniel S. Larkin
(74) Attorney, Agent, or Firm—Ohlandt, Greeley, Ruggiero & Perle LLP

(57) ABSTRACT

A level meter for motor vehicle fuel tanks comprises a float element. With the float element, a lever is connected that is adapted to be pivoted about a pivot axis. Further, the level meter comprises a position sensor as well as a position transmitter connected with the lever. At the level of the position sensor, the position transmitter is connected with the lever. The position transmitter cooperates with the position sensor in a contactless manner.

10 Claims, 2 Drawing Sheets

LEVEL METER

BACKGROUND OF THE INVENTION

As level meter for fuel tanks, float elements are known, communicating the altitude of the float element via a potentiometer. To this end, the float element is connected to a contact pin contacting tracks of a potentiometer as a slide. Moving the contact pin or slide relative to the tracks functioning as position sensors results in a change of resistance. Depending on the change of resistance, the level can be determined by means of an appropriate evaluating means. Particularly with modern fuels and fuel mixtures, such level meters suffer from the disadvantage that the slide contacts may become conglutinated and/or the tracks are provided with a solid coating. Thereby, considerable measuring faults can be provoked. Further, using a slide contact is disadvantageous in that the slide contact as well as the tracks are subject to wear.

Furthermore, capacitive level meters based on a basically different principle are known as level meters. Such level meters do not have a float element. A printed circuit board is rather inserted into the fuel tank and the level is detected by a change of the dielectric constant of the medium between the two plates of the capacitor. Since the change of capacity of the capacitors depends on the level, the level can be detected from the change of capacity. Such level meters, however, are utterly complicated and expensive.

SUMMARY OF THE INVENTION

It is the object of the invention to provide a wear-free level meter with a simple structure.

The level meter according to the invention comprises a float element and a position transmitter connected with the float element. Further, the level meter comprises a position sensor cooperating with the position transmitter. In this connection, the position sensor is stationary. The position transmitter may be stationary as well, and the position sensor may be connected to the float element. According to the invention, the position transmitter and the position sensor cooperate in a contactless manner. Because of the contactless position sensing, no wear occurs. Further, the slide contacts cannot conglutinate since a coating or film caused by the fuel does not disturb in case of a contactless position sensing.

Preferably, the float element is connected with a pivotable lever. When the level in a fuel tank changes, the float element is lifted or lowered and in doing so, it is turned about a pivot axis of the lever.

A synchro or resolver can be provided as position transmitter and position sensor. The structure of a synchro is similar to that of a synchronous motor. In a synchro, a stator winding is fed two alternating voltages. At the rotor winding, a voltage is induced by the two voltages applied to the stator windings. Depending on the position of the rotor, the two induced voltages are shifted with respect to each other. From this phase shift, a rotational angle can be detected. When using a synchro as position transmitter and position sensor, the stator windings serve as position transmitter and the rotor winding serves as position sensor in the afore-mentioned example. According to the invention, the rotatable rotor shaft is connected with the pivot axis of the lever so that pivoting the lever effects that the rotor axis rotates.

It is also possible in a synchro to apply an alternating voltage to the windings of a rotor with two poles. The stator comprises at least two coils offset by at least 90°. Depending on the position of the rotor, a voltage is induced into them. From the comparison of the two voltages, in turn, a rotation angle can be deduced. In this embodiment, the winding of the rotor is thus the position transmitter and the coils of the stator are the position sensors.

When a synchro connected with the pivot axis of the lever is used as position transmitter and position sensor, the level can be simply detected from the pivot angle and the lever geometry.

In a particularly preferred embodiment of the invention, the position transmitter is connected with the lever at a distance to the pivot axis thereof. According to the invention, the position transmitter, in turn, cooperates with a position sensor in a contactless manner. Preferably, it is a contactless electromagnetic position detection. The position transmitter generates an electromagnetic field that is detected by the position sensor. In this preferred embodiment, the position transmitter moves on an orbit. Because of the distance to the pivot axis of the lever, a very precise position detection is possible in this embodiment. The positions of the position transmitter and the position sensor can of course be exchanged in this embodiment as well.

It is particularly preferred to provide a meander-shaped track as a position sensor that is preferably stationary. The track then extends over the entire measuring path. In a level meter comprising a lever at which the position transmitter is arranged, the track is configured in the shape of a circle sector. Preferably, a first track comprising at least one meander loop cooperates with the meander-shaped track as a position transmitter. Since voltage is applied to the first track of the position transmitter, a voltage is induced into the meander-shaped track when the position transmitter is moved. Preferably, the position sensor and the position transmitter are assembled in correspondence with a measuring slide, the position transmitter preferably comprising two tracks to each of which a voltage is applied. By a suitable selection of the width of the meander loops of the first and second track of the position transmitter, which preferably corresponds to the width of the meander loops of the track of the position sensor, and an offset of the relative position between the two tracks of the position transmitter and the meander loops of the position sensor, a very precise position detection can be performed. Then, the position sensor is preferably connected with an evaluating means that, among other things, counts the cycles or zero crossings of the voltages measured by the position sensor. Therefrom, the angular position of the lever of the level meter and thus the level can be detected.

In all the afore-mentioned embodiments, the positions of the position transmitter and the position sensor can be exchanged.

Particularly the provision of meander-shaped tracks displaceable with respect to each other, which is particularly preferred according to the invention, may be provided for a float element connected with a lever as well as for a float element moving on a straight line.

The particular advantages of the cooperation of the position transmitter with the position sensor, which is effected, according to the invention, in a contactless manner, are that no contacting and frictional problems occur and thus, there is no abrasion as with slide contacts, for example. Further, the level meter according to the invention is able to be easily evaluated and insensitive with respect to electrostatic discharges. Particularly, it is possible to seal the tracks by dip-coating, for example. Furthermore, the level meter according to the invention is utterly insensitive with respect to temperature variations.

Further, an optical system can also be provided as position transmitter and position sensor. As position transmitter, for example, a radiation-emitting transmitter, a light source, for example, can be provided the position of which is determined by a position sensor such as a photoelectrode.

It is further possible to provide a magnet-sensitive sensor/magnet system as position transmitter and position sensor. Magnet-sensitive sensors, magnetoresistive sensors, Hall sensors and Wiegand effect sensors are particularly suitable.

A further possibility for detecting the rotation angle of a pivot axis that is particularly connected with the float element consists in detecting the angular position by two sensors mutually offset by 90° or also by three sensors mutually offset by 120°. Further, the angular position can be detected in that, for example, the pivot axis itself is configured as a magnetic rod being rotated about its center, this being also possible in an eccentric manner. The angular position can also be detected by a lateral approximation with a constant or variable air gap between the sensor and a rotating position transmitter.

Instead of detecting an angular position, the detection of a linear position, i.e., a linear shift between the position transmitter and the position sensor, is possible, too. This is particularly possible by a lateral approximation with a constant air gap between the sensor and the linearly movable position transmitter as well.

BRIEF DESCRIPTION OF THE DRAWINGS

Hereinafter, the invention is explained in detail with respect to a preferred embodiment with reference to the accompanying drawings. In the Figures.

DETAILED DESCRIPTION OF THE FIGURES

Figure 1:
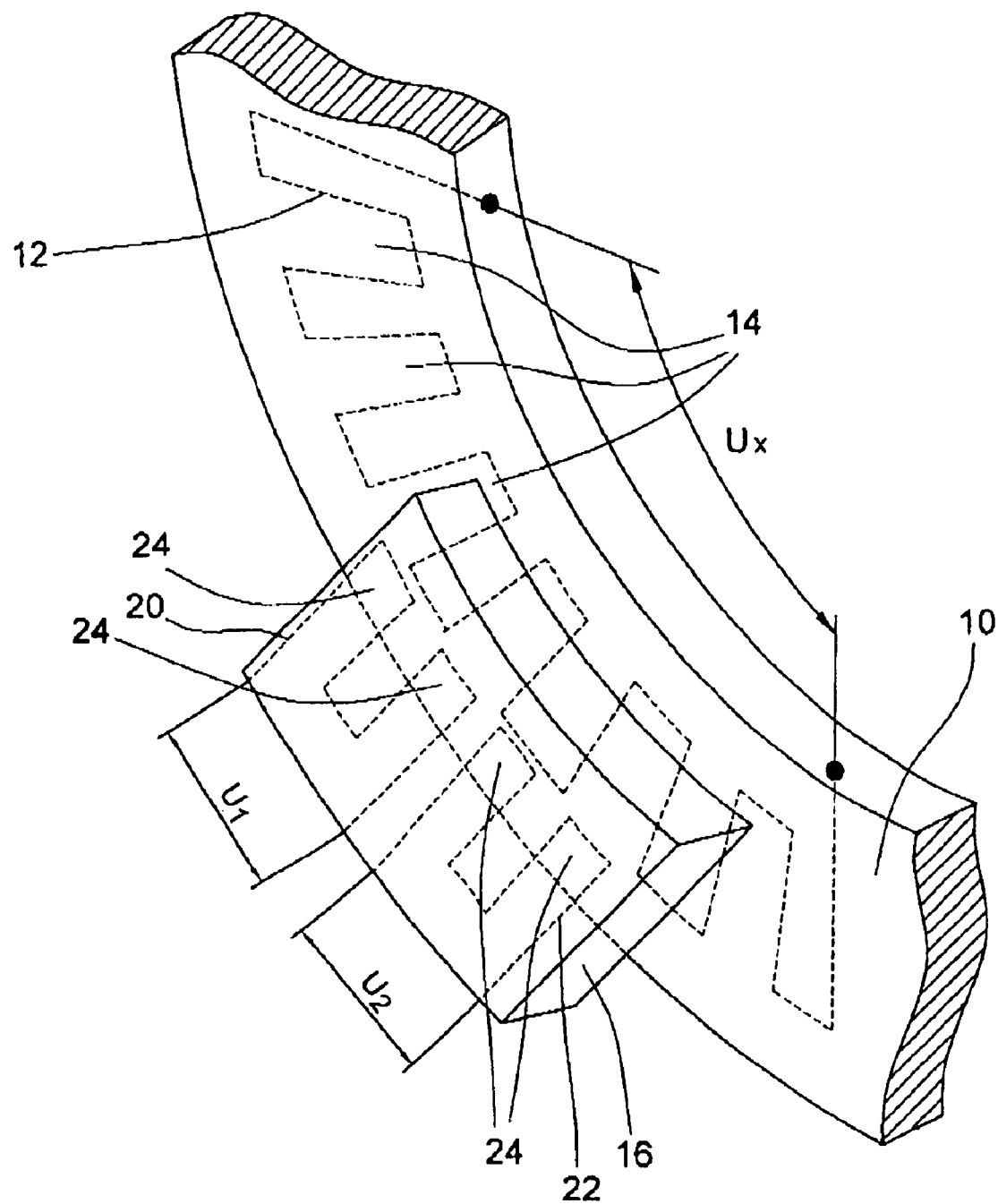
FIG. 1 shows a schematic diagram for explaining the preferred measuring system.
Figure 2:
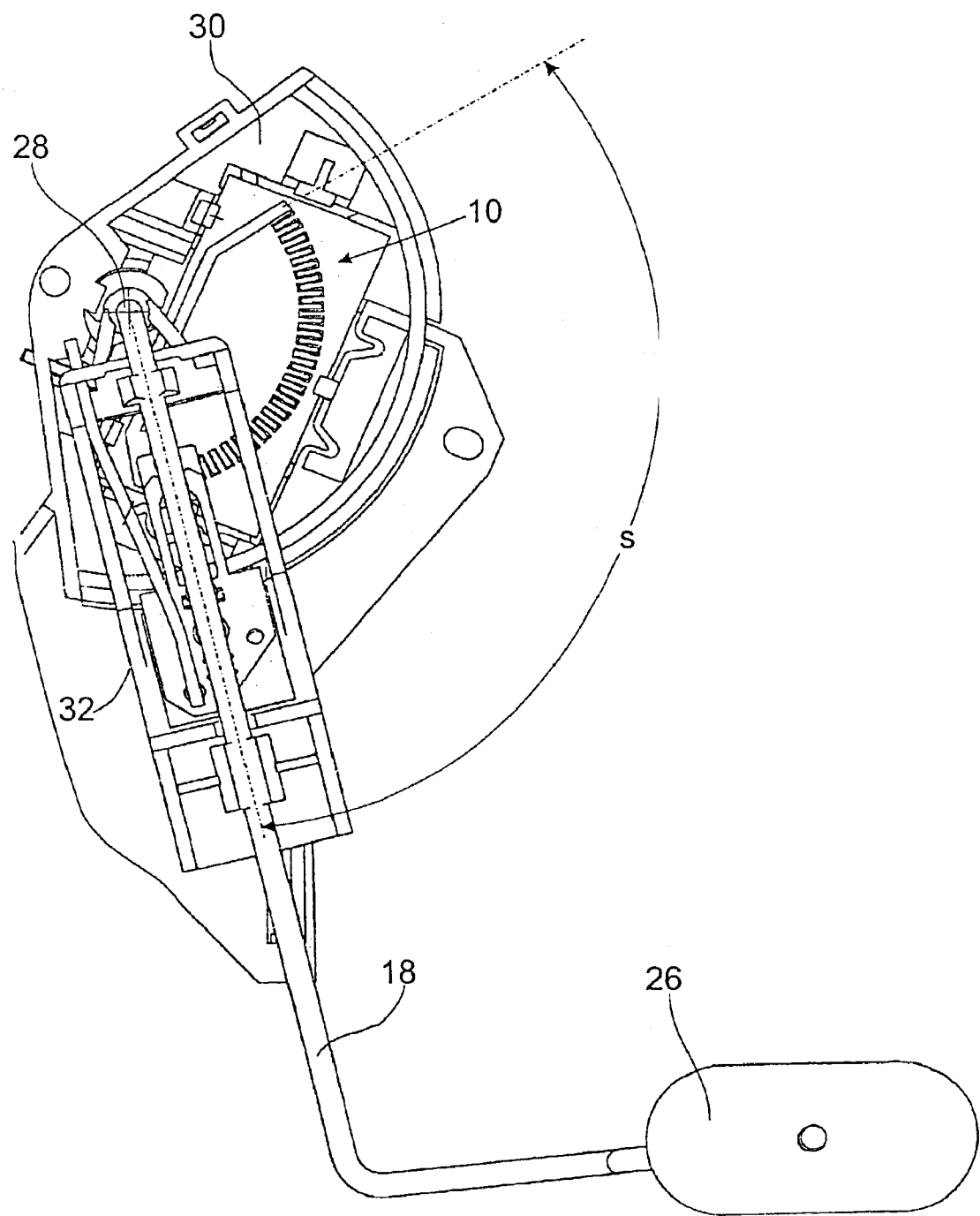
FIG. 2 shows a schematic side view of a preferred embodiment of the level meter.

FIG. 1 corresponds to a section of the measuring system of the level meter illustrated in FIG. 2. Here, a stationary position sensor 10 is provided, comprising a meander-shaped track 12. The track 12 extends over the entire measuring path s (FIG. 2) of the level meter. The meander-shaped track 12 comprises a plurality of substantially rectangular meander loops 14 arranged behind one another. The meander loops 14 have a constant width and respectively have the same height.

A position transmitter 16 is arranged opposite to the position sensor 10. The position transmitter 16 is arranged at a distance to the position sensor 10 so that a contactless position sensing is performed. The position transmitter 16 is arranged at the level of the position sensor 10, for example at a lever 18 of the level meter illustrated in FIG. 2, at the level of the position sensor 10. The position transmitter 16 comprises a first track 20 as well as a second track 22. The two tracks 20,22 have an identical configuration, each track 20,22 comprising two meander loops 24. The width as well as the height of the meander loops 24 preferably corresponds to the width and the height of the meander loops 14. The two tracks 20,22 of the position transmitter 16 are preferably offset with respect to each other particularly by a fourth of the meander spacing, i.e., by half the width of a meander loop, in order to achieve good measured values.

To the two tracks 20,22 of the position transmitter 16, voltages $U_1$ and $U_2$ respectively, are applied. By shifting the position transmitter 16 with respect to the position sensor 10, a voltage $U_x$ is induced in the meander-shaped track 12 of the position sensor. Because of the offset of the two tracks 20,22 of the position sensor, two mutually offset voltages are induced. In order to determine the measuring path, the cycles of successive changes are counted. For a precise determination of the path, the phase position of the voltages $U_x$ with respect to $U_1$ is detected within a cycle.

For detecting the voltage $U_x$, the position sensor 10 is connected with an evaluating means by which, among other things, the counting is effected. Further, when providing the measuring principle illustrated in FIG. 1 in a level meter illustrated in FIG. 2, the evaluating means is adapted to directly convert the distance covered via the angular position of the lever 18 and in dependence of the geometry of the lever 18 into the level of the fuel tank.

The preferred embodiment of the level meter comprises a float element 26 (FIG. 2) that is connected with the lever 18. The lever 18 is supported so as to be pivoted about a pivot axis 28. At the level of the position sensor 10, the position transmitter 16 is connected with the lever 18. When the fluid level changes, the floatable float element is lifted or lowered and thus, the lever 18 is rotated about the pivot axis 28. In doing this, a movement of the position transmitter 16 connected with the lever 18 is performed with respect to the stationary position sensor 10. To this end, the position sensor 10 is provided at a holding device 30. Furthermore, a reset element 32, such as a spring, is provided with the lever 18, by which it is ensured that the float element 26 is always located on top of the surface of the fuel.

What is claimed is:

1. A level meter for the fuel tanks of motor vehicles, comprising:

a float element, a position transmitter connected with the float element, and a position sensor cooperating with the position transmitter, wherein the position transmitter and the position sensor cooperate in a contactless manner and wherein said position sensor further comprises a meander-shaped track, said meander-shaped track extending over an entire measuring path.

2. The level meter of claim 1, wherein the float element is connected with a pivotable lever.

3. The level meter of claim 2, wherein the position transmitter is connected with the lever at a distance to a pivot axis thereof.

4. The level meter of claim 1, wherein the position transmitter comprises a first track comprising at least one meander loop.

5. The level meter of claim 4, wherein the position transmitter comprises two tracks which comprises at least one meander loop, respectively.

6. The level meter of claim 5, wherein the tracks are offset with respect to each other by a quarter of the a meander spacing.

7. The level meter of claim 6, wherein said meander spacing is defined by a spacing of two adjacent meander loops of said meander shaped track.

8. The level meter of claim 1, wherein the position sensor is connected with an evaluating means.

9. The level meter of claim 1, wherein the position transmitter and the position sensor are a sensor/magnet system sensitive to magnetic fields.

10. A level meter for the fuel tanks of motor vehicles, comprising:

a float element;

a position transmitter connected with the float element; and a position sensor cooperating with the position transmitter, wherein the position transmitter and the position sensor cooperate in a contactless manner, and wherein said position sensor further comprises a meander-shaped track, said meander-shaped track extending over an entire measuring path, and wherein said entire measuring path is defined by a first end position of the position transmitter and a second end position of said position transmitter, said first end position corresponding to about a lowest position of said float element, and said second end position corresponding to about a highest position of said float element.

* * * * *